US010278156B2

(12) United States Patent
Kaufman et al.

(10) Patent No.: US 10,278,156 B2
(45) Date of Patent: Apr. 30, 2019

(54) STREAMING MEDIA CELLULAR BROADCAST

(71) Applicant: AT&T Intellectual Property I, L.P., Atlanta, GA (US)

(72) Inventors: Darren Kaufman, Olathe, KS (US); Brian Wilson, Johnston, IA (US); Frank Robert Coppa, Kansas City, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 66 days.

(21) Appl. No.: 15/269,073

(22) Filed: Sep. 19, 2016

(65) Prior Publication Data

US 2018/0084527 A1    Mar. 22, 2018

(51) Int. Cl.
*H04W 4/06* (2009.01)
*H04W 72/00* (2009.01)

(52) U.S. Cl.
CPC .......... *H04W 72/005* (2013.01); *H04W 4/06* (2013.01)

(58) Field of Classification Search
CPC .............................. H04W 72/005; H04W 4/06
USPC ....................................................... 370/312
See application file for complete search history.

(56) References Cited

U.S. PATENT DOCUMENTS

| | | | | |
|---|---|---|---|---|
| 7,953,083 B1 * | 5/2011 | Evans | ................... | H04L 67/104 370/390 |
| 8,615,241 B2 * | 12/2013 | Gupta | ............... | H04W 36/0011 455/437 |
| 8,695,043 B2 | 4/2014 | Ponomarev et al. | | |
| 8,886,803 B1 * | 11/2014 | Kandekar | ............... | H04L 69/28 709/201 |
| 8,990,874 B2 | 3/2015 | Huang | | |
| 9,083,585 B2 | 7/2015 | Oran | | |
| 9,226,014 B2 | 12/2015 | Song et al. | | |
| 9,357,436 B2 | 5/2016 | Rogers et al. | | |
| 2009/0245256 A1 * | 10/2009 | Yan | ......................... | H04L 12/18 370/390 |
| 2011/0305183 A1 * | 12/2011 | Hsu | ..................... | H04W 72/005 370/312 |
| 2014/0201383 A1 | 7/2014 | Kuehnel et al. | | |
| 2014/0204894 A1 * | 7/2014 | Chang | ..................... | H04W 4/06 370/329 |

(Continued)

OTHER PUBLICATIONS

Holbrook, Cain; Request for Comments: 4607, Source-Specific Multicast for IP (Aug. 2006).*

*Primary Examiner* — Peter G Solinsky

(57) ABSTRACT

Devices, computer-readable media, and methods for allocating a source specific multicast internet protocol address to a streaming media content are disclosed. For example, a processor of a device may receive a streaming media content, allocate a source specific multicast internet protocol address to the streaming media content for a base station of a cellular network, allocate a first broadcast channel of the base station to the streaming media content, and associate the first broadcast channel with the source specific multicast internet protocol address. The processor may further generate a manifest file, the manifest file including an identification of the streaming media content and the source specific multicast internet protocol address, transmit the manifest file via a second broadcast channel of the base station, and transmit the streaming media content via the first broadcast channel of the base station.

20 Claims, 4 Drawing Sheets

(56) References Cited

U.S. PATENT DOCUMENTS

| | | |
|---|---|---|
| 2014/0229529 A1 | 8/2014 | Barone et al. |
| 2014/0269335 A1 | 9/2014 | Gupta et al. |
| 2014/0280746 A1 | 9/2014 | Johns |
| 2015/0117204 A1 | 4/2015 | Lott et al. |
| 2015/0263847 A1* | 9/2015 | Baillargeon .......... H04L 7/0008 370/216 |
| 2015/0358940 A1* | 12/2015 | Zhang .................... H04W 4/06 370/312 |
| 2016/0132278 A1* | 5/2016 | Gillard ...................... G06F 3/14 345/682 |
| 2016/0173915 A1 | 6/2016 | McCarthy et al. |
| 2016/0323784 A1* | 11/2016 | Ma .................... H04W 36/0022 |
| 2016/0381431 A1* | 12/2016 | Patterson ........... H04N 21/6405 725/110 |

\* cited by examiner

STREAMING MEDIA CELLULAR BROADCAST

The present disclosure relates generally to delivery of streaming media content via a cellular network, and more particularly to devices, computer-readable media, and methods for allocating a source specific multicast internet protocol address to a streaming media content and to devices, computer-readable media, and methods for subscribing to a streaming media content associated with a source specific multicast internet protocol address.

BACKGROUND

Media streaming services may interface with mobile applications, or clients residing on users' smartphone devices. For example, music may be streamed from servers of a music streaming service to a mobile application of a smartphone device using a multicasting protocol. A similar architecture may be used where video is streamed to mobile application clients from servers of a video streaming service. A telecommunications service provider network acts as a pass-through data service which simply transmits and receives Internet Protocol (IP) packets to facilitate media streaming.

SUMMARY

In one example, the present disclosure discloses a device, computer-readable medium, and method for allocating a source specific multicast internet protocol address to a streaming media content. For example, a method may include a processor for receiving a streaming media content, allocating a source specific multicast internet protocol address to the streaming media content for a base station of a cellular network, allocating a first broadcast channel of the base station to the streaming media content, and associating the first broadcast channel with the source specific multicast internet protocol address. The processor may further generate a manifest file, the manifest file including an identification of the streaming media content and the source specific multicast internet protocol address, transmit the manifest file via a second broadcast channel of the base station, and transmit the streaming media content via the first broadcast channel of the base station.

In another example, the present disclosure discloses a device, computer-readable medium, and method for subscribing to a streaming media content associated with a source specific multicast internet protocol address. For example, a method may include a processor for receiving a first manifest file via a first broadcast channel of a first base station. The first manifest file may include an identification of a first plurality of streaming media contents and a first plurality of source specific multicast internet protocol addresses associated with the first plurality of streaming media contents. The processor may then present a listing of the first plurality of streaming media contents, receive a selection of one of the first plurality of streaming media contents, and transmit a first request to subscribe to the one of the first plurality of streaming media contents to the first base station. The first request may include a first source specific multicast internet protocol address of the first plurality of source specific multicast internet protocol addresses that is associated with the one of the first plurality of streaming media contents for the first base station. The processor may further receive an identification of a second broadcast channel of the base first station in response to the first request, the second broadcast channel of the first base station associated with the one of the first plurality of streaming media contents, tune to the second broadcast channel of the first base station, and receiving the one of the first plurality of streaming media contents via the second broadcast channel of the first base station.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
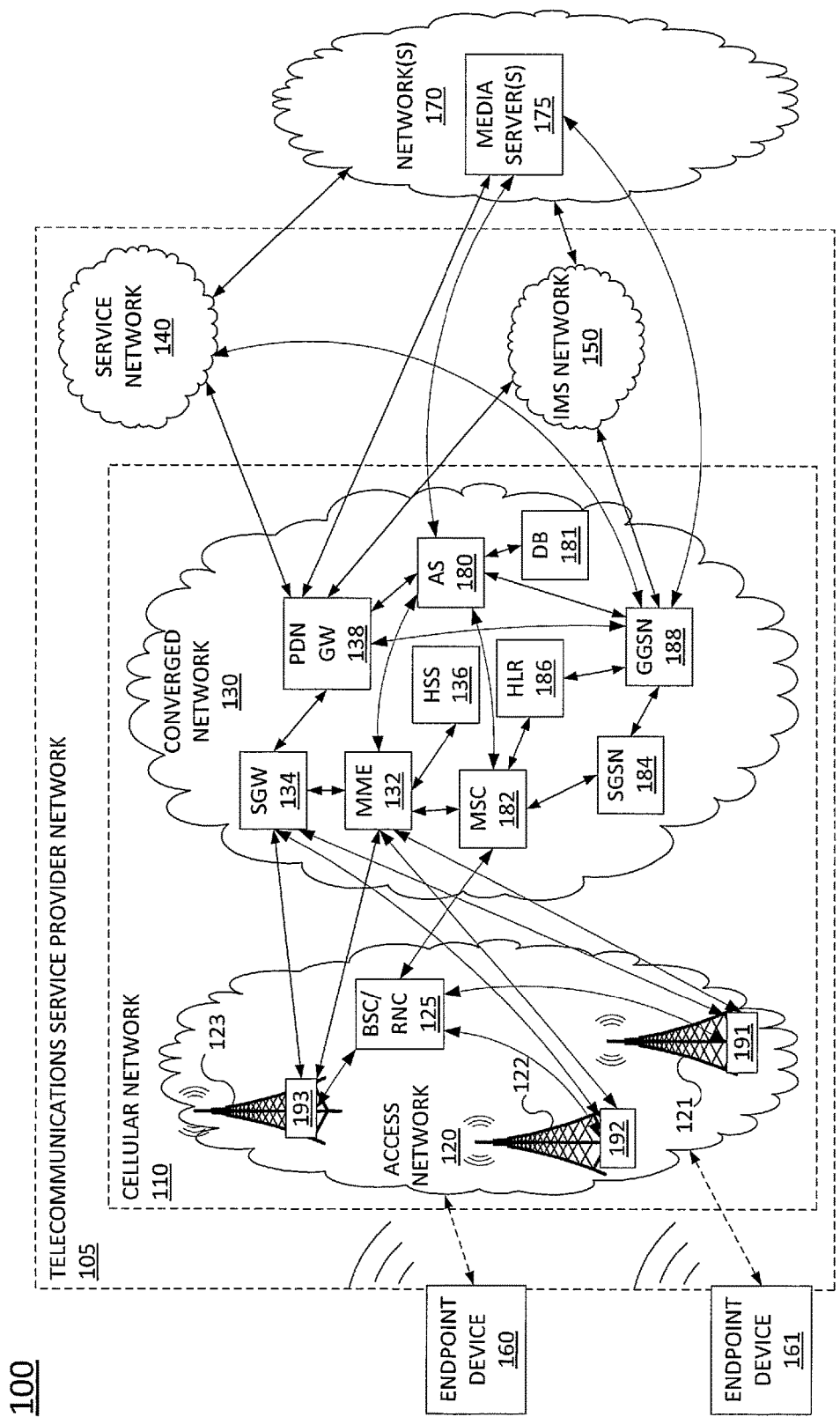
FIG. 1 illustrates an example system related to the present disclosure.

The present disclosure broadly discloses devices, computer-readable media, and methods for allocating a source specific multicast internet protocol address to a streaming media content and for subscribing to a streaming media content associated with a source specific multicast internet protocol address, e.g., within a cellular network. Examples of the present disclosure distribute streaming media content in a more efficient manner than each endpoint device receiving a unique stream through the entire system.

For instance, many users in a geographic area may want to connect to a live event stream. It is customary for each endpoint device to establish a unique data session extending through a telecommunications service provider network to a source. For cellular endpoint devices, each endpoint device may be allocated one or more unique radio frequency (RF) carriers for a data session, with subsequent wired transport back from the cell site into the core network and/or the cloud. Thus, each of the endpoint devices uses an incremental amount of bandwidth for the respective sessions. In contrast, examples of the present disclosure utilize shared RF bandwidth to deliver a series or selection of streaming media content, e.g., live broadcast content via the cellular network, such that all endpoint devices in a cell or sector can share the same broadcast stream and use one shared session, while the endpoint devices are not connected to each other. For instance, broadcast streaming media content may comprise video and/or audio relating to live sporting events, news, weather, scheduled television or audio programming, and other types of media content that is presented at a time that is selected by a network operator and/or a media provider, without input or selection from users as to the timing of the delivery of the streaming media content.

In one example, a cellular network receives streaming media content from a media provider, e.g., via a content distribution network. For instance, the streaming media content may be distributed via a satellite receiver or via a wired network, and placed into one or more servers of the cellular network that can distribute the content. In one example, control information and the actual streaming media content are delivered to cell sites, e.g., base stations and/or related components, such as radio network controllers (RNCs), base station controllers (BSCs), media control units (MCUs), and so forth. In one example, base stations broadcast the control data in the form of a manifest file, e.g., an extensible markup language (XML)/text based file. In one example, the streaming media contents may be broadcast/transmitted via different broadcast channels, e.g., RF resource blocks or the like, which may be selected from a pool of available RF resources of the base station.

In addition, in one example the manifest file is transmitted on a particular broadcast channel, e.g., a control channel, of the base station. For instance, a known control channel may be used to broadcast a manifest file at each cell site. The manifest file for each cell site may identify the streaming media contents that are available at that cell site, and may provide source specific multicast (SSM) Internet Protocol (IP) addresses assigned to the streaming media contents. An endpoint device may then request, e.g., subscribe, to a particular streaming media content by sending a request with the SSM IP address. A response may be provided to the endpoint device identifying a broadcast channel on which the streaming media content is broadcast by the base station. These and other aspects of the present disclosure are discussed in greater detail below in connection with the examples of FIGS. 1-4.

It should be noted that as referred to herein, the term "session" includes a sequence or flow, comprising one or more packets, segments, datagrams, frames, cells, protocol data units, service data unit, bursts, and so forth, as well as control and management communications related to the establishment, continuity, and termination of the session. The particular terminology or types of data units involved may vary depending upon the underlying network technology. Thus, the term "packet" is intended to refer to various types of data units that may comprise a session or flow. In addition, the terms "configure," and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

To better understand the present disclosure, FIG. 1 illustrates an example network, or system 100 that may implement embodiments of the present disclosure for allocating a source specific multicast Internet Protocol address to a streaming media content and for subscribing to a streaming media content associated with a source specific multicast Internet Protocol address. In one example, the system 100 includes a telecommunications service provider network 105. The telecommunications service provider network 105 may comprise a cellular network 110, a service network 140, and an IP Multimedia Subsystem (IMS) network 150. The system 100 may further include other networks 170 connected to the telecommunications service provider network 105. Endpoint devices 160 and 161 may each comprise a cellular telephone, a smartphone, a tablet computing device, a laptop computer, a pair of computing glasses, a wireless enabled wristwatch, or any other cellular-capable mobile telephony and computing device (broadly, an "endpoint device"). In one example, endpoint devices 160 and 161 may communicate with cellular network 110 using multiple cellular communication technologies, such as GSM/time-division multiple access (TDMA) communications, wideband code division multiple access (WCDMA), CDMA2000 communications, orthogonal frequency division multiple access (OFDMA), and the like over various frequency bands.

In one example, the cellular network 110 comprises an access network 120 and a converged network 130, e.g., a cellular core network with components for 2G-4G and beyond architectures. For example, as illustrated in FIG. 1, access network 120 may include a Universal Mobile Telecommunications System (UMTS) terrestrial radio access network (UTRAN) portion, an evolved UTRAN (eUTRAN), and a base station subsystem (BSS), e.g., a Global System for Mobile communication (GSM) radio access network (GRAN), while converged network 130 may include evolved packet core (EPC) network components, and network switching subsystem (NSS)/GSM core network and/or General Packet Radio Service (GPRS) core network components. For example, base stations 121, 122, and 123 may each comprise a base transceiver station (BTS), a NodeB, and an eNodeB. In other words, base stations 121-123 may each comprise a cell site with 2G, 3G, and 4G/LTE components. As illustrated in FIG. 1, access network 120 further includes a base station controller (BSC)/radio network controller (RNC) 125, which may perform a variety of wireless network management related tasks such as wireless channel assignments, determining transmission power levels, controlling handovers from one base station to another base station (e.g., for sessions using 2G and/or 3G infrastructure), concentrating multiple signals from endpoint devices for onward transmission to other portions of the access network 120, or converged network 130, and to perform other functions. In the present example, BSC/RNC 125 may coordinate 2G and 3G communications such as GSM/TDMA communications, WCDMA or CDMA2000 communications, and the like via base stations 121-123.

In one example, each of the base stations 121-123 may have an associated media coordination unit (MCU) 191-193. MCUs 191-193 may receive manifest files (or control data that is used to create manifest files) and streaming media contents, and may re-broadcast the manifest files and streaming media contents via RF broadcast channels of the respective base stations 121-123, as described in greater detail below. In one example, each of MCUs 191-193 may comprise a computing system, such as computing system 400 depicted in FIG. 4, specifically configured to perform various steps, functions, and/or operations in connection with examples of the present disclosure for allocating a source specific multicast Internet Protocol address to a streaming media content and for subscribing to a streaming media content associated with a source specific multicast Internet Protocol address.

In one example, converged network 130 provides various functions that support wireless services in the 2G-4G/LTE environment. For instance, network devices Mobility Management Entity (MME) 132 and Serving Gateway (SGW) 134 provide various functions for LTE-based communications. For example, MME 132 is the control node for the LTE access networks, such as eUTRAN portions of access network 120 (e.g., eNodeBs). In one embodiment, MME 132 is responsible for user equipment (UE)/endpoint device tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G network portions. For LTE-based communications, converged network 130 may also include a Home Subscriber Server (HSS) 136 that contains subscription-related information (e.g., subscriber profiles), performs authentication and authorization of a wireless service user, and provides information about the subscriber's location. The converged network 130 may also comprise a packet data network (PDN) gateway 138 which serves as a gateway that provides access between the converged network 130 and various data networks, e.g., service network 140, IMS network 150, networks 170, and the like. The packet data network gateway 138 is also referred to as a PDN gateway, a PDN GW or a PGW. In one example, the LTE/EPC portions of converged network 130 may comprise an Internet Protocol (IP)/multi-protocol label switching (MPLS) backbone that supports both real-time and non-real-time service delivery.

As mentioned above, converged network 130 may also include NSS/GSM core network and/or GPRS core network components. For example, converged network 130 may include one or more mobile switching centers (MSCs) for each wireless access network that forms part of the system 100, such as MSC 182 for access network 120. The converged network 130 may further include one or more home location registers (HLRs), such as HLR 186, which functions as a central repository of authentication and service validation information, subscription information, and other information pertaining to user subscriptions and services. Similarly, respective visiting location registers (VLRs) may be integrated within each MSC, and may function as temporary repositories of authentication and service validation information, subscription information, and other information pertaining to visiting user subscriptions and services when an endpoint device is located in a particular geographic region serviced by a particular MSC/VLR. For example, MSC 182 may be designated to serve and administer a first coverage area including access network 120. Thus, MSC 182 may maintain, e.g., in a VLR, user profile records for endpoint devices currently serviced by base stations within the portion of the network that is the responsibility of MSC 182 (e.g., endpoint device 160).

Converged network 130 may also include GPRS network elements for handling data calls to and from endpoint devices. Such network elements may include a serving GPRS support node (SGSN) 184, a gateway GPRS support nodes (GGSN) 188, and related support components including media servers, application servers, and the like. An SGSN refers to a network node responsible for communicating with endpoint devices and routing of data calls. Similar to MSC 182, SGSN 184 may have specific coverage areas and be assigned to handle specific wireless access networks of the system 100. A GGSN refers to a network node responsible for the interworking between a GPRS network (e.g., components of converged network 130 that support GPRS services and functionality) and external packet switched networks, e.g., service network 140, IMS network 150, and networks 170. Thus, FIG. 1 illustrates various connections between GGSN 188 and other components of system 100. In one example, the GPRS portions of converged network 130 may comprise an IP/MPLS. In addition, converged network 130 may include various links and interfaces between 2G/3G components and 4G/LTE components for coordination of various services. For instance, connections between MME 132 and MSC 182 and between PDN GW 138 and GGSN 188 are shown in FIG. 1. For ease of illustration, other connections may exist but are omitted from the example of FIG. 1.

In one example, IMS network 150 may include a proxy call session control function (P-CSCF), a serving call session control function (S-CSCF), a billing and traffic (B&T) server, an ENUM (tElephone NUmbering Mapping) server 168, a domain name service (DNS) server, and other components (not shown). In one example, service network 140 may comprise one or more devices for providing services to subscribers, customers, and or users. For example, telecommunications service provider network 105 may provide a cloud storage service, web server hosting, and other services. As such, service network 140 may represent aspects of telecommunications service provider network 105 where infrastructure for supporting such services may be deployed.

In the example of FIG. 1, converged network 130 may include an application server (AS) 180. In one example, AS 180 may comprise a computing system, such as computing system 400 depicted in FIG. 4, specifically configured to perform various steps, functions, and/or operations for allocating a source specific multicast internet protocol address to a streaming media content, in accordance with the present disclosure. In one example, converged network 130 may also include a database (DB) 181, e.g., a physical storage device integrated with AS 180, or attached or coupled to AS 180, to store various information regarding media streaming services, users, and/or their endpoint devices. For instance, DB 181 may store streaming media content and metadata regarding the streaming media content, e.g., information such as the titles, durations, formats, encoding types, ratings, etc., of the streaming media content. DB 181 may also store control information related to the broadcasting of streaming media content from base station sites, e.g., base stations 121-123 in access network 120. For instance, control information may include selections of broadcast channels to use to broadcast different streaming media contents via the base stations 121-123 and selections of SSM IP addresses to be associated with the same and different streaming media contents for the various base stations 121-123. In one example, metadata and/or control information relating to streaming media content may be stored in manifest files that may be retrieved and sent by AS 180 to MCUs 191-193. In another example, AS 180 may retrieve metadata and/or control information relating to streaming media content from DB 181 and may generate the manifest files before sending the manifest files to MCUs 191-193. In still another example, AS 180 may retrieve metadata and/or control information relating to streaming media content from DB 181 and may forward the metadata and/or control information to MCUs 191-193, where MCUs 191-193 may create respective manifest files to be broadcast at each of the base station sites/base stations 121-123.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. The other networks 170 may comprise one or more media servers 175, which may be operated by one or more media providers, and which may provide various types of streaming media content. In one example, media servers 175 may comprise one or more computing devices for providing media to various recipient devices via media streaming sessions. For instance, media servers 175 may comprise IP multicast servers for providing streaming media to various recipient devices over various networks which may employ the same or different types of communication technologies. In one example, media servers 175 may store complementary or redundant copies of the same streaming media content. Thus, any one or more of media servers 175 may be selected as a source to stream selected streaming media content to recipient devices.

In one example, media servers 175 may broadcast streaming media content using an IP multicast protocol. For instance, one of the media servers 175 may comprise a source to send streaming media content as to a designated group IP address. Recipient devices may then indicate a desire to receive the streaming media content by sending a join request that indicates the group address. Routers, switches, and other devices in transport paths between the source and various recipient devices may then construct distribution trees which ingest the streaming media content from the source, replicate the streaming media content and transmit copies of the streaming media content toward the recipient devices. Thus, for example, AS 180 may receive the streaming media content from the one of the media servers 175 by sending a join request indicating the IP group address for the particular streaming media content, where routers, switches, gateways, and the like in one or more networks between the one of the media servers 175 and AS 180 may route the streaming media content to AS 180 (and any other recipient devices that join the group) in response to the join request. AS 180 may then propagate the streaming media content toward MCUs 191-193, e.g., via PDN GW 138 and SGW 134 (e.g., for 4G/LTE service) and/or via GGSN 188, SGSN 184, and BSC/RNC 125 (e.g., for 2G/3G service). For example, AS 180 may generate its own IP multicast stream with MCUs 191-193 sending join requests to join the group associated with the stream, or AS 180 may unicast the streaming media content to one or more of the MCUs 191-193.

Alternatively, or in addition, MCUs 191-193 may also send join request indicating the IP group address for the IP multicast stream associated with the streaming media content sourced from the one of the media servers 175. In other words, MCUs 191-193 may comprise independent recipient devices associated with the streaming media content that may be multicast by the one of the media servers 175. In such an example, the streaming media content may be propagated from the one of the media servers 185 to PDN GW 138 and/or GGSN 188 and onward through the converged network 130 and access network 120 to the respective MCUs 191-193 without AS 180 serving as a point of re-multicasting. However, in such an example, AS 180 may still perform management functions related the broadcasting of the streaming media content via RF broadcast channels of the respective base stations 121-123. In any of the foregoing examples, the MCUs 191-193 receive streaming media content and may then rebroadcast the streaming media content via RF broadcast channels via base stations 121-123. In this regard, MCUs 191-193 may receive the streaming media content over 2G/3G infrastructure or via 4G/LTE infrastructure, and may rebroadcast the streaming media content via NodeB portions of base stations 121-123, respectively, or via eNodeB portions of base stations 121-123, respectively.

In one example, AS 180 may select RF resources of base stations 121-123 for the broadcast of respective streaming media contents. For instance, AS 180 may send control plane communications to and receive control plane communications from base stations 121-123 and/or the associated MCUs 191-193 to determine available RF resources, such as OFDMA resource blocks. For a particular streaming media content, and for a particular one of base stations 121-123, AS 180 may select RF resources for the streaming media content to be broadcast and may notify the base station and/or the MCU accordingly. As described above, the base station and/or the associated MCU may receive the streaming media content via a variety of paths through the system 100. In any event, the one of the base stations 121-123 and/or the one of the associated MCUs 191-193 may then rebroadcast the streaming media content via the selected RF resources. In another example, AS 180 may communicate with MME 132 and/or MSC 182 to indicate an intent to broadcast streaming media content via base stations 121-123. In turn, MME 132 and/or MSC 182 may then communicate with base stations 121-123, MCUs 191-193, and/or BSC/RNC 125 to determine available RF resources of the respective base stations 121-123, to select RF resources for broadcasts of various streaming media content and to instruct the respective base stations 121-123, MCUs 191-193, and/or BSC/RNC 125 to utilize the RF resources that are selected for the respective streaming media content.

In addition, as described above, MCUs 191-193 may be provided with or may generate manifest files associated with streaming media content that is being broadcast or that is to be broadcasted via base stations 121-123, respectively. For example, for one of the base stations 121-123, a manifest file may include identification(s) of the streaming media content(s) (e.g., one or more live audio or video programs) and one or more source specific multicast (SSM) IP addresses associated with the one or more live audio or video programs. In one example, the manifest file may include additional information for each streaming media content, such as a duration of the streaming media content, a rating of the streaming media content, a formatting and/or an encoding of the streaming media content, and so on. In one example, the respective manifest files may be broadcast via one or more dedicated control channels of the base stations 121-123. For example, the one or more dedicated control channels may be designated in advance, and may be known by endpoint devices such that endpoint devices may obtain manifest files via the relevant control channel(s). For instance, in one example, endpoint devices 160 and 161 may determine the relevant control channel(s) to receive manifest files via out-of-band communications with AS 180, MME 132, and/or MSC 182. In one example, the control channel(s) for broadcasting manifest files may be selected by AS 180, MME 132 and/or MSC 182 in the same or in a similar manner as described above in connection with the selection of RF resources for broadcasting the actual streaming media content.

Endpoint devices 160 and 161 may receive the manifest files from one or more of the base stations 121-123 and may then present information regarding available streaming media content for the users of such devices. For instance, the endpoint devices 160 and 161 may present titles, start and end times, durations, ratings, short descriptions, and so forth pertaining to the streaming media content that is identified in the manifest file(s). Endpoint devices 160 and 161 may present the information via a display screen or via audio output. Endpoint devices 160 and 161 may also receive selections of streaming media content from users and/or applications of the endpoint devices. For instance, a user of endpoint device 160 may select streaming media content "X" which is indicated to be broadcast. In response to such a selection, the endpoint device 160 may retrieve a SSM IP address of the selected streaming media content from the manifest file obtained from one of the base stations 121-123. For instance, the endpoint device may select the SSM IP address from the manifest file of the one of the base stations 121-123 that is the closest to the endpoint device 160 or that presents the highest signal-to-noise ratio, or based upon a similar criteria. In one example, the endpoint device may send a "subscribe" request that includes the SSM IP address assigned to the streaming media content in order to subscribe to the particular streaming media content.

The "subscribe" request may be sent to the one of the base stations 121-123, MMUs 191-193, MME 132, MSC 182, or AS 180, depending upon the particular architecture or network configuration and depending upon which component is responsible for the selection and/or the assignment of RF resources to the streaming media content. In response to the "subscribe" request, one of the base stations 121-123, MMUs 191-193, MME 132, MSC 182, or AS 180 may then determine the RF resources of the one of the base stations 121-123 on which the streaming media content associated with the SSM IP address is being broadcast, and may send a response indicating to the endpoint device 160 the particular RF resources on which the streaming media content is being broadcast via the one of the base stations 121-123. In one example, the device receiving the "subscribe" request may verify that the endpoint device 160 is permitted to receive the streaming media content. For instance, certain streaming media content may be restricted to certain subscribers, e.g., based upon whether the subscriber has paid to receive the streaming media content, based upon an age of the subscriber, etc. For instance, a parent that owns an endpoint device, e.g., a subscriber, may indicate to the cellular network 105 that endpoint device 161 is for use by the subscriber's child and should not receive streaming media content. Thus, a "subscribe" request from such a device may be denied. In one example, the response may include an encryption key or the like to allow the endpoint device 160 to access the streaming media contents, e.g., when the subscriber and/or the endpoint device is authorized to receive the streaming media content. Endpoint device 160 may then tune the RF resources identified, receive the streaming media content via the RF resources, and present the streaming media content at the endpoint device 160.

The system 100 may also provide for continuity of an endpoint device receiving streaming media content as the endpoint device moves from one location to another, or as the radio environment changes. For example, endpoint device 160 may obtain different manifest files from each of base stations 121-123. The same streaming media content may be identified in the different manifest files, but may have a different SSM IP addresses associated with the streaming media content. In addition, different RF resources may be utilized for broadcasting the same streaming media content via different ones of the base stations 121-123. To illustrate, endpoint device 161 may receive streaming media content via a first set of RF resource blocks from base station 121. However, endpoint device 161 may be moving toward base station 122, such that a received signal strength indicator (RSSI), or the like, of base station 122 may increase to the point that the RSSI of base station 122 becomes greater than the RSSI of base station 121. At this time, the endpoint device 161 may send a "subscribe" request that includes the SSM IP address assigned to the streaming media content with respect to base station 122. The "subscribe" request may be sent to the base station 122, MMU 192, MME 132, MSC 182, or AS 180, depending upon the particular architecture or network configuration and depending upon which component is responsible for the selection and/or the assignment of RF resources to the streaming media content. In response to the "subscribe" request, the base station 122, MMU 192, MME 132, MSC 182, or AS 180 may then determine the RF resources of the base station 122 on which the streaming media content is being broadcast, and may send a response indicating to the endpoint device 161 the particular RF resources on which the streaming media content is being broadcast via the base station 122. Endpoint device 160 may then tune to the RF resources identified, and continue to receive the streaming media content via the RF resources of the base station 122. A similar process may be followed as the endpoint device 161 moves away from base station 122 toward base station 123.

In one example, the response may further include an encryption key to allow the endpoint device 161 to access the streaming media content via base station 122. For instance, it may first be verified whether the endpoint device 161 is authorized to receive the streaming media content via base station 122, and if so, the encryption key may be provided in the response. Notably, even though endpoint device 161 may be authorized to receive the streaming media content via base station 121, it may not automatically be the case that endpoint device 161 is also authorized to receive the streaming media content via base station 122. For example, some content may have a geographic restriction such that an endpoint device is not permitted to receive the streaming media content when outside of a particular area, notwithstanding that other endpoint devices may be permitted to receive the same streaming media content outside of such an area.

It should be noted that the system 100 has been simplified. In other words, the system 100 may be implemented in a different form than that which is illustrated in FIG. 1. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, MCUs 191-193 may be integrated within the respective base stations 121-123. Similarly, although the AS 180 and DB 181 are illustrated as components of service network 140, and media servers 175 are illustrated as a components within networks 170, in other examples, any one or more of these components may be deployed in a different configuration. For example, AS 180 and DB 181 may be deployed within IMS network 150, or within converged network 130.

In addition, various elements of access network 120, converged network 130, and IMS network 150 are omitted for clarity, including gateways or border elements providing connectivity between such networks, internal routers within converged network 130, and so on. Similarly, due to the relatively large number of connections available between devices in the system 100, various links between MME 132, SGW 134, base stations 121-123, MCUs 191-193, SMSC 180, PDN GW 138, SMSG 180, and other components of system 100 are also omitted for clarity. Moreover, although aspects of the present disclosure have been discussed above in the context of a converged network with GSM/TDMA-based, GPRS/CDMA-based, and LTE/OFDMA-based components, examples of the present disclosure are not so limited. For example, the teachings of the present disclosure can be applied to networks and systems that use other types of wireless/cellular technologies, such as enhanced data rates for GSM evolution (EDGE), IS-95, or a future technology or standard-based network, e.g., a 5G network, and so forth. Thus, these and other modifications are all contemplated within the scope of the present disclosure.

Figure 2:
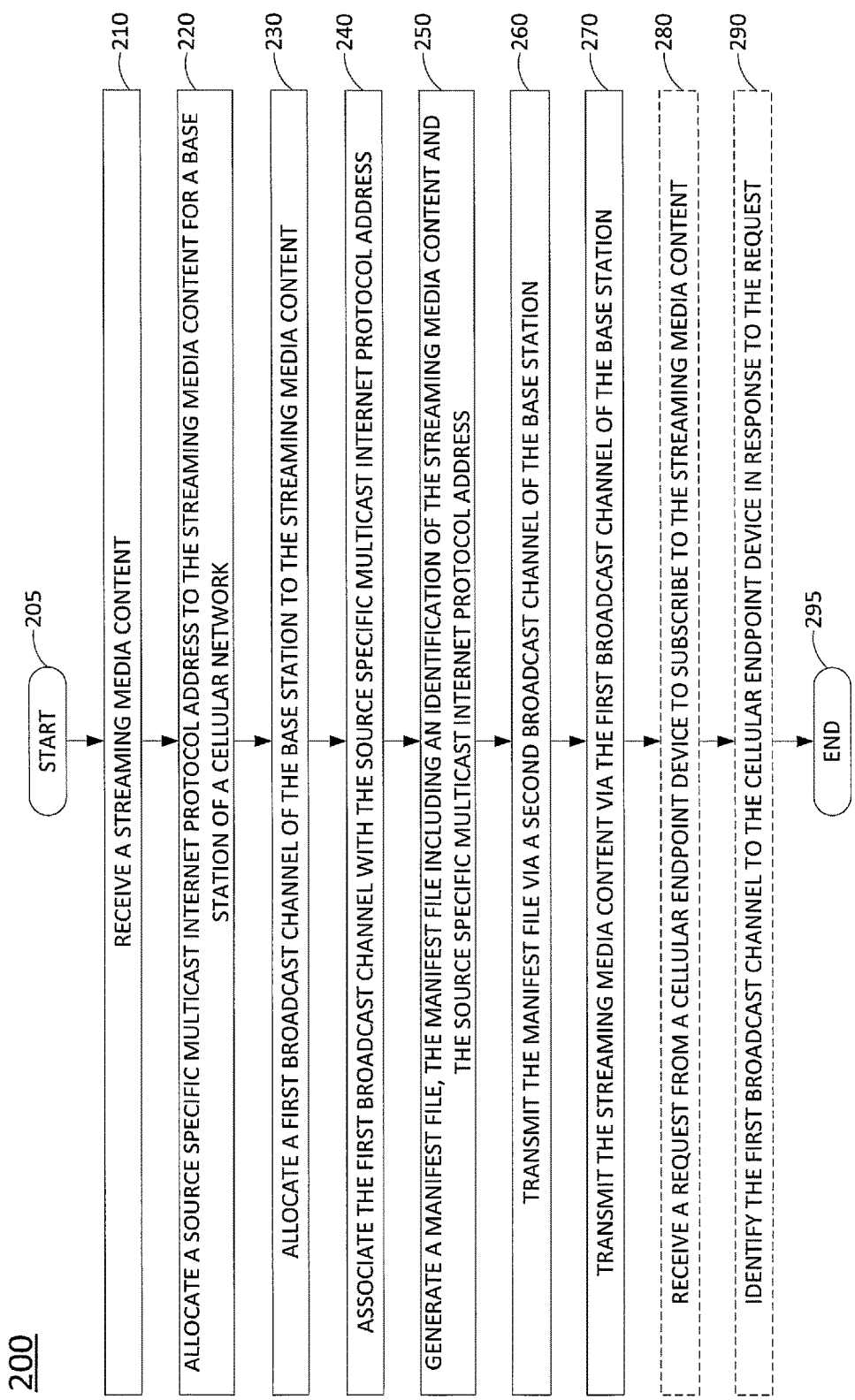
FIG. 2 illustrates a flowchart of an example method for allocating a source specific multicast internet protocol address to a streaming media content.

FIG. 2 illustrates a flowchart of an example method 200 for allocating a source specific multicast internet protocol address to a streaming media content, in accordance with the present disclosure. In one example, steps, functions and/or operations of the method 200 may be performed by a centralized cellular network-based device, e.g., deployed in an evolved packet core (EPC), such as 180, or AS 180 in conjunction with other components of the system 100, such as DB 181, MCUs 191-193, and so forth. In another example, the method 200 may be performed by a device deployed in a cellular access network, e.g., in a UTRAN or an eUTRAN, such as a base station and/or an MCU. In one example, the steps, functions, or operations of method 200 may be performed by a computing device or system 400, and/or processor 402 as described in connection with FIG. 4 below. For instance, computing device or system 400 may represent AS 180 or an MCU of the present disclosure. For illustrative purposes, the method 200 is described in greater detail below in connection with an example performed by a processor, such as processor 402. The method begins in step 205 and proceeds to step 210.

At step 210, the processor receives a streaming media content. For example, a media server, such as an IP multicast server, may provide streaming media to various recipient devices over various networks. In one example, the processor may receive the streaming media content from the media server by sending a join request indicating the IP group address for the particular streaming media content, where routers, switches, gateways, and the like in one or more networks between the media server and the processor may route the streaming media content to processor (and any other recipient devices that join the group) in response to the join request. In another example where the processor may comprise a processor of a base station or MCU, the streaming media content may be received from another component of the cellular network, such as an application server that is multicasting the streaming media content.

At step 220, the processor allocates a SSM IP address to the streaming media content for a base station of a cellular network. In one example, where the processor is a centralized cellular network component, the processor may select different SSM IP addresses for the streaming media content for different base stations of the cellular network. The base station may comprise, for example, a NodeB, an eNodeB, a BTS, a combination of any of the foregoing, and so on.

At step 230, the processor allocates a first broadcast channel of the base station to the streaming media content. For instance, in one example the processor may select RF resources of the base station for the broadcast of the streaming media content. In an example where the processor may comprise a centralized cellular network component, the processor may send control plane communications to and receive control plane communications from the base station, or an associated media control unit (MCU), to determine available RF resources, such as OFDMA resource blocks. The processor may then select RF resources for the streaming media content to be broadcast and may notify the base station and/or the MCU accordingly. It should be noted that in connection with step 230 the processor may also allocate a broadcast channel at one or more additional base stations to broadcast the same streaming media content.

At step 240, the processor associates the first broadcast channel with the SSM IP address. For instance, the processor may store a record associating the first broadcast channel with the SSM IP address, e.g., in a database and/or a data storage device associated with the processor, for a duration of the streaming media content, or as long as there is otherwise a purpose for maintaining the association between the first broadcast channel and the SSM IP address. In one example, a record associating the first broadcast channel with the SSM IP address may alternatively or additional be sent to and stored by other devices, such as an RNC/BSC, a HSS, and so forth.

At step 250, the processor generates a manifest file for the base station that is utilized in connection with the method 200, the manifest file including an identification of the streaming media content and the SSM IP address. In one example, the manifest file may comprise a text-based file including identification(s) of one or more streaming media contents (e.g., one or more live audio or video programs, including at least the streaming media content received at step 210) and one or more SSM IP addresses associated with the one or more streaming media contents. In one example, the manifest file may include additional information for each streaming media content, such as a duration of the streaming media content, a rating of the streaming media content, a formatting and/or an encoding of the streaming media content, and so on. In one example, different manifest files may be generated for different base stations, each manifest file for streaming media content(s) being broadcast via a respective base station.

At step 260, the processor transmits the manifest file via a second broadcast channel of the base station. For instance, if the processor is a centralized cellular network component, the processor may send the manifest file to the base station and/or an MCU associated with the base station for transmission over the second broadcast channel. In one example, the manifest file (i.e., the manifest file for the base station that is utilized in connection with the method 200) may be broadcast via one or more dedicated control channels (e.g., a downlink control channel) of the base station. For example, the one or more dedicated control channels may be designated in advance, and may be known by endpoint devices such that endpoint devices may obtain manifest files via the relevant control channel(s). However, in another example, endpoint devices may determine the relevant control channel(s) to receive manifest files via out-of-band communications with the processor, with an MME and/or an MSC, and so forth. In one example, the control channel(s) for broadcasting manifest files may be selected in the same or in a similar manner as the selection of the first broadcast channel at step 230 (e.g., RF resources, such as OFDMA resource blocks, or the like, for broadcasting the actual streaming media content).

At step 270, the processor transmits the streaming media content via the first broadcast channel of the base station. The streaming media content may be deployed to the base station and/or the associated MCU via a variety of paths from a media server or from another device. In any event, the base station and/or the MCU via the base station may then rebroadcast the streaming media content on the selected RF resources. In one example, where the processor comprises a centralized cellular network component, the processor may communicate with an MME and/or an MSC of the cellular network to indicate an intent to broadcast streaming media content via the base station. In turn, the MME and/or the MSC may then communicate with the base station, the MCU, or a BSC/RNC if the streaming media content is to use 2G/3G infrastructure, to instruct the respective base station, MCU, and/or BSC/RNC to utilize the first broadcast channel to broadcast the streaming media content via the base station. It should be noted that in accordance with the present disclosure, the streaming media content is transmitted at a time that is selected by the media provider or at a time that is selected by an operator of the cellular network, e.g., as opposed to on-demand media that is delivered at a time selected by a user. For instance, the streaming media content may comprise live media, e.g., live audio or video, or may comprise scheduled programming. Following step 270, the method 200 may proceed to step 295 or to optional step 280.

At optional step 280, the processor may receive a request from a cellular endpoint device to subscribe to the streaming media content. For example, the cellular endpoint device may receive the manifest file by tuning to the second broadcast channel and may then present information regarding available streaming media content for the user of the cellular endpoint device. The user or an application of the cellular endpoint device may then select the streaming media content which is indicated to be broadcast. In response to such a selection, the cellular endpoint device may retrieve a SSM IP address of the selected streaming media content from the manifest file and send a "subscribe" request, e.g., directed to the processor and/or the device in which the processor is deployed as a recipient. The request may include the SSM IP address assigned to the streaming media content in order to subscribe to the particular streaming media content.

At optional step 290, the processor may identify the first broadcast channel to the cellular endpoint device in response to the request. For instance, in response to the "subscribe" request, the processor may determine the first broadcast channel on which the streaming media content is being broadcast, and may send a response indicating to the cellular endpoint device the first broadcast channel, e.g., the particular RF resources, on which the streaming media content is being broadcast via the base station. In one example, the cellular endpoint device tunes to the first broadcast channel after the first broadcast channel is identified and receives the streaming media content. In one example, the response may further include an encryption key to allow the cellular endpoint device to access the streaming media content. For instance, it may first be verified whether the cellular endpoint device is authorized to receive the streaming media content via the base station, and if so, the encryption key may be provided in the response. Thus, in one example, the endpoint device may further use an encryption key to decrypt the streaming media content that is transmitted via the first broadcast channel.

Following step 270 or either of optional step 280 or step 290, the method 200 may proceed to step 295 where the method 200 ends. In addition, it should be noted that the method 200 may be expanded to include additional steps, may be modified to perform different steps, or may omit certain steps. For instance, in one example the processor may unicast or multicast the streaming media content to one or more base stations. In one example, the processor may make multiple copies of the streaming media content, e.g., higher or lower quality video, such as with higher or lower bit rates, video resolutions, etc., and may select to provide different copies for broadcasting via different base stations. Alternatively, or in addition, the processor may select to send different versions of the streaming media content at different times and/or to different base stations, e.g., due to detected congestion, based upon which components of a base station may be used to broadcast the streaming media contents via the first broadcast channel, e.g., 2G/3G components versus 4G/LTE components, and so forth. Thus, these and other modifications are all contemplated within the scope of the present disclosure.

Figure 3:
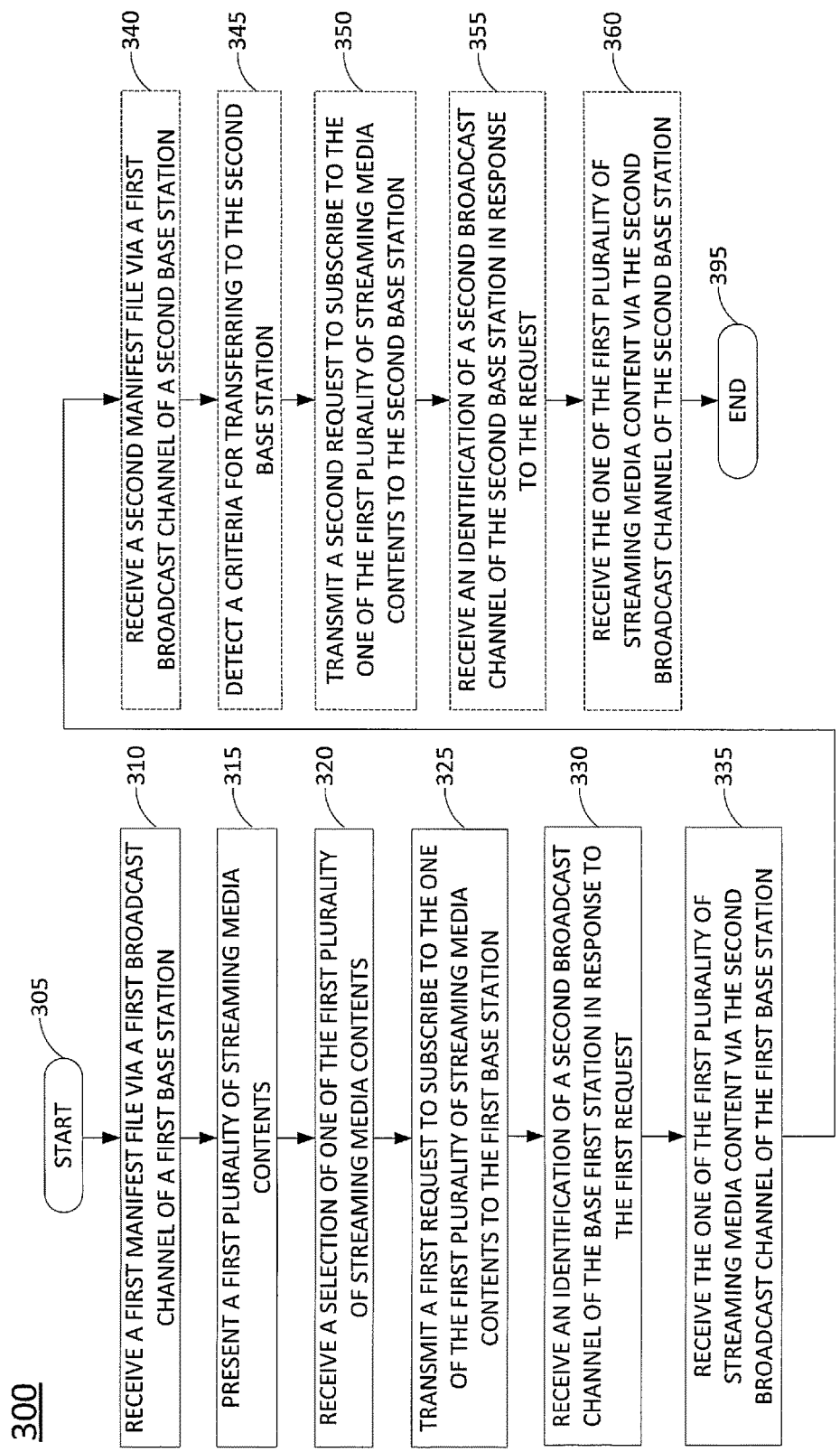
FIG. 3 illustrates a flowchart of an example method for subscribing to a streaming media content associated with a source specific multicast internet protocol address.

FIG. 3 illustrates a flowchart of an example method 300 for subscribing to a streaming media content associated with a source specific multicast internet protocol address, in accordance with the present disclosure. In one example, steps, functions and/or operations of the method 300 may be performed by an endpoint device, such as endpoint device 160 or 161 of FIG. 1, or an endpoint device in conjunction with other components of the system 100, such as AS 180, MCUs 191-193, and so forth. In one example, the steps, functions, or operations of method 300 may be performed by a computing device or system 400, and/or processor 402 as described in connection with FIG. 4 below. For instance, computing device or system 400 may represent an endpoint device of the present disclosure. For illustrative purposes, the method 300 is described in greater detail below in connection with an example performed by a processor, such as processor 402. The method begins in step 305 and proceeds to step 310.

At step 310, the processor receives a first manifest file via a first broadcast channel of a first base station. In one example, the first manifest file includes an identification of a first plurality of streaming media contents and a first plurality of SSM IP addresses associated with the first plurality of streaming media contents that are being broadcast or that will be broadcast via the first base station. In one example, the first broadcast channel may be a dedicated control channel of the first base station that is known by the processor in advance. In another example, the processor may determine the first broadcast channel via out-of-band communications with a component of a cellular access network, such as a base station, MCU, and/or a core cellular network component, such as an MME, an MSC, or an application server for allocating a source specific multicast internet protocol address to a streaming media content, in accordance with the present disclosure.

At step 315, the processor presents a listing of the first plurality of streaming media contents. For instance, the processor may present titles, start and end times, durations, ratings, short descriptions, and so forth pertaining to the streaming media contents that are identified in the first manifest file via a display screen or via audio output.

At step 320, the processor receives a selection of one of the first plurality of streaming media contents. The selection may be made by a user or by application of the cellular endpoint device of the processor. For instance, a user of the cellular endpoint device may select via a touch screen input, a keyboard input, a voice command, etc., one of the streaming media contents which is indicated to be broadcast.

At step 325, the processor transmits a first request to subscribe to the one of the first plurality of streaming media contents to the first base station. In one example, the first request may comprise a "subscribe" request that includes a first SSM IP address of the first plurality of SSM IP addresses that is associated with the one of the first plurality of streaming media contents for the first base station. For instance, in response to the selection received at step 320, the processor may retrieve a SSM IP address of the selected streaming media content from the first manifest file.

At step 330, the processor receives an identification of a second broadcast channel of the base first station in response to the first request. For instance, the second broadcast channel of the first base station may be associated with the one of the first plurality of streaming media contents. In other words, the one of the first plurality of streaming media contents may be broadcast via the second broadcast channel. In one example, the identification of the second broadcast channel identifies the particular RF resources on which the streaming media content is being broadcast via the first base station. In one example, the identification is provided to the processor by the first base station, by an MCU associated with the first base station, by a BSC/RNC, a HSS, a HLR, or by an application server for allocating a source specific multicast internet protocol address to a streaming media content, depending upon the particular network architecture of the system that is associated with the method 300.

At step 335, the processor receives the one of the first plurality of streaming media contents via the second broadcast channel of the first base station. For example, the processor may tune a radio receiver portion of the cellular endpoint device to the second broadcast channel of the first base station after receiving the identification of the second broadcast channel. The processor may then present the streaming media content, e.g., via a display screen and/or via an audio speaker or headphone. In one example, the information received at step 330 may further include an encryption key to allow the processor to access the one of the first plurality of streaming media contents. For instance, it may first be verified whether the processor (or the cellular endpoint device of the processor and/or the user of such device) is authorized to receive the one of the first plurality of streaming media contents via the first base station, and if so, the encryption key may be provided to the processor. Thus, in one example, the processor may further use an encryption key to decrypt the one of the first plurality of streaming media contents that is received via the second broadcast channel of the first base station. Following step 335, the method 300 may proceed to step 395 or to optional step 340.

At optional step 340, the processor may receive a second manifest file via a first broadcast channel of a second base station. In one example, the second manifest file may include an identification of a second plurality of streaming media contents and a second plurality of SSM IP addresses associated with the second plurality of streaming media contents. In addition, in one example the second plurality of streaming media contents includes the one of the first plurality of streaming media contents. In other words, the one of the first plurality of streaming media contents is identified in both the first manifest file of the first base station and in the second manifest file of the second base station. The processor may receive the second manifest file at a later time than receiving the first manifest file, such as when the processor moves into an area of coverage of the second base station. However, the processor may also receive the second manifest file at optional step 340 at the same time or even prior to receiving the first manifest file, depending upon how the processor move throughout the environment, depending upon the RF conditions experienced by the processor and/or the cellular endpoint device, and so forth. In one example, the processor may receive the first manifest file and the second manifest file, and may initially select the first base station for receiving the one of the first plurality of streaming media content. For instance, the processor may receive the same streaming media content from either of the first or second base stations, but may select the first base station based if the first base station has a higher received signal strength indicator (RSSI), is closer to the processor, provides a higher or lower bitrate broadcast of the streaming media content, and/or based upon additional factors.

At optional step 345, the processor may detect one or more criteria for transferring to the second base station. For instance, the system may also provide for continuity in receiving streaming media content as the processor and/or cellular endpoint device moves from one location to another, or as the radio environment changes. For instance, the processor may be receiving the one of the first plurality of streaming media contents via the second broadcast channel of the first base station, but may be moving away from the first base station, the strength of an interference signal may be increasing with respect to the second broadcast channel of the first base station, the RSSI of the second base station may increase such that it exceeds the RSSI of the first base station, a signal-to-noise ratio (SNR) of the second base station may exceed that of the first base station, and so forth. If any of such criteria is met, the processor may therefore determine that reception of the one of the first plurality of streaming media content should be transitioned from the first base station to the second base station.

At optional step 350, the processor may transmit a second request to subscribe to the one of the first plurality of streaming media contents to the second base station. The second request may include a second SSM IP of the second plurality of SSM IP addresses that is associated with the one of the first plurality of streaming media contents for the second base station. In one example, the operations of optional step 350 may comprise the same or substantially similar operations to step 325.

At optional step 355, the processor may receive an identification of a second broadcast channel of the second base station in response to the request, the second broadcast channel of the second base station associated with the one of the first plurality of streaming media contents. In other words, the one of the first plurality of streaming media contents may be broadcast via the second broadcast channel of the second base station. In one example, the identification of the second broadcast channel of the second base station identifies the particular RF resources on which the streaming media content is being broadcast via the second base station. In one example, the identification is provided to the processor by the second base station, by an MCU associated with the second base station, by a BSC/RNC, a HSS, a HLR, or by an application server for allocating a source specific multicast internet protocol address to a streaming media content, depending upon the particular network architecture of the system that is associated with the method 300. In one example, the information received at optional step 355 may further include another encryption key to allow the processor to access the one of the first plurality of streaming media contents. For instance, the streaming media content may be encrypted differently at the second base station. In one example, the operations of optional step 355 may comprise the same or substantially similar operations to step 330.

At optional step 360, the processor may receive the one of the first plurality of streaming media contents via the second broadcast channel of the second base station. For example, the processor may tune a radio receiver portion of the cellular endpoint device to the second broadcast channel of the second base station after receiving the identification of the second broadcast channel of the second base station. In one example, the operations of optional step 360 may comprise the same or substantially similar operations to step 335. For instance, in one example, the processor may further use the encryption key that may be received at step 330 or the additional encryption key that may be received at optional step 355 to decrypt the one of the first plurality of streaming media contents that is received via the second broadcast channel of the second base station. The processor may then continue to present the one of the first plurality of streaming media contents as the reception is transitioned from the first base station to the second base station.

Following step 335 or any of optional steps 340-360, the method 300 may proceed to step 395 where the method 300 ends.

In addition, it should be noted that although not specifically specified, one or more steps, functions or operations of the method 200 and/or the method 300 may include a storing, displaying and/or outputting step as required for a particular application. In other words, any data, records, fields, and/or intermediate results discussed in the method 200 and/or the method 300 can be stored, displayed and/or outputted to another device as required for a particular application. Furthermore, steps or blocks in FIGS. 2 and 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 and/or method 300 may comprise optional steps, or can be combined, separated, and/or performed in a different order from that described above, without departing from the example embodiments of the present disclosure.

Figure 4:
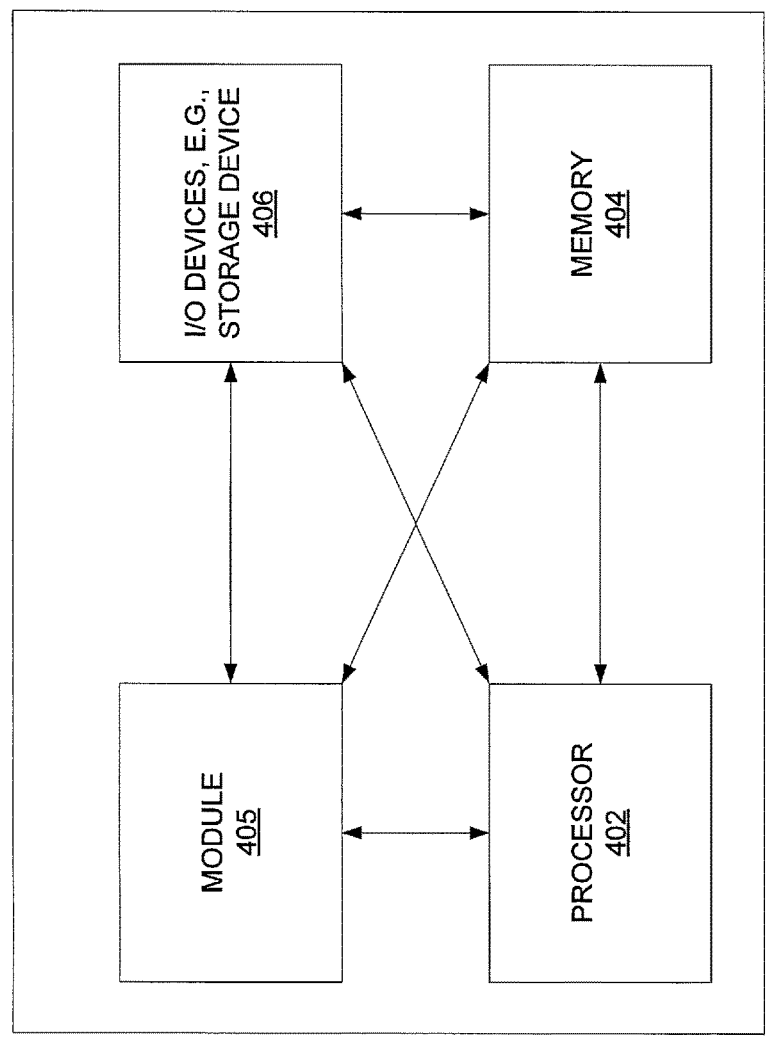
FIG. 4 illustrates an example high-level block diagram of a computer specifically programmed to perform the steps, functions, blocks, and/or operations described herein.

FIG. 4 depicts a high-level block diagram of a computing device specifically programmed to perform the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for allocating a source specific multicast internet protocol address to a streaming media content and/or for subscribing to a streaming media content associated with a source specific multicast internet protocol address, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or method 300, or the entire method 200 or method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or method 300. In one embodiment, instructions and data for the present module or process 405 allocating a source specific multicast internet protocol address to a streaming media content and/or for subscribing to a streaming media content associated with a source specific multicast internet protocol address (e.g., a software program comprising computer-executable instructions) can be loaded into memory 404 and executed by hardware processor element 402 to implement the steps, functions or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for allocating a source specific multicast internet protocol address to a streaming media content and/or for subscribing to a streaming media content associated with a source specific multicast internet protocol address (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
 a processor of a cellular network; and
 a computer-readable medium storing instructions which, when executed by the processor, cause the processor to perform operations, the operations comprising:
  receiving a streaming media content;
  allocating a source specific multicast Internet protocol address for a first base station of a plurality of base stations of the cellular network to the streaming media content;

allocating a first broadcast channel of the first base station to the streaming media content;
associating the first broadcast channel with the source specific multicast internet protocol address for the first base station;
generating a manifest file, the manifest file including an identification of the streaming media content and the source specific multicast Internet protocol address for the first base station;
transmitting the manifest file via a second broadcast channel of the first base station;
receiving a request from a cellular endpoint device to subscribe to the streaming media content;
identifying the first broadcast channel to the cellular endpoint device in response to the request; and
transmitting the streaming media content via the first broadcast channel of the first base station.

2. The device of claim 1, wherein the manifest file comprises a text-based file associating a plurality of source specific multicast internet protocol addresses with a plurality of broadcast channels of the first base station.

3. The device of claim 1, wherein the second broadcast channel comprises a downlink control channel of the first base station.

4. The device of claim 1, wherein the first broadcast channel comprises a first plurality of downlink radio frequency resource blocks of the first base station, and wherein the second broadcast channel comprises a second plurality of downlink radio frequency resource blocks of the first base station.

5. The device of claim 1, wherein the processor is deployed in a uniform terrestrial radio access network of the cellular network or an evolved uniform terrestrial radio access network of the cellular network.

6. The device of claim 1, wherein the processor is deployed in an evolved packet core.

7. The device of claim 1, wherein the streaming media content is received from a server of a media provider.

8. The device of claim 7, wherein the streaming media content comprises a live media.

9. The device of claim 7, wherein the streaming media content is transmitted at a time that is selected by the media provider.

10. The device of claim 1, wherein the streaming media content is transmitted at a time that is selected by an operator of the cellular network.

11. The device of claim 1, wherein the cellular endpoint device tunes to the first broadcast channel after the first broadcast channel is identified.

12. A non-transitory computer-readable medium storing instructions which, when executed by a processor in a cellular network, cause the processor to perform operations, the operations comprising:
receiving a streaming media content;
allocating a source specific multicast internet protocol address for a first base station of a plurality of base stations of the cellular network to the streaming media content;
allocating a first broadcast channel of the first base station to the streaming media content;
associating the first broadcast channel with the source specific multicast internet protocol address for the first base station;
generating a manifest file, the manifest file including an identification of the streaming media content and the source specific multicast Internet protocol address for the first base station;
transmitting the manifest file via a second broadcast channel of the first base station;
receiving a request from a cellular endpoint device to subscribe to the streaming media content;
identifying the first broadcast channel to the cellular endpoint device in response to the request; and
transmitting the streaming media content via the first broadcast channel of the first base station.

13. The non-transitory computer-readable medium of claim 12, wherein the manifest file comprises a text-based file associating a plurality of source specific multicast internet protocol addresses with a plurality of broadcast channels of the first base station.

14. A device comprising:
a processor; and
a computer-readable medium storing instructions which, when executed by the processor, cause the processor to perform operations, the operations comprising:
receiving a first manifest file via a first broadcast channel of a first base station of a plurality of base stations of a cellular network, the first manifest file including an identification of a first plurality of streaming media contents and a first plurality of source specific multicast internet protocol addresses for the first base station that is associated with the first plurality of streaming media contents;
presenting a listing of the first plurality of streaming media contents;
receiving a selection of one of the first plurality of streaming media contents;
transmitting a first request to subscribe to the one of the first plurality of streaming media contents to the first base station, the first request including a first source specific multicast internet protocol address for the first base station of the first plurality of source specific multicast internet protocol addresses for the first base station that is associated with the one of the first plurality of streaming media contents;
receiving an identification of a second broadcast channel of the first base station in response to the first request, the second broadcast channel of the first base station associated with the one of the first plurality of streaming media contents;
tuning to the second broadcast channel of the first base station; and
receiving the one of the first plurality of streaming media contents via the second broadcast channel of the first base station.

15. The device of claim 14, wherein the operations further comprise:
receiving a second manifest file via a first broadcast channel of a second base station of the plurality of base stations, the second manifest file including an identification of a second plurality of streaming media contents and a second plurality of source specific multicast internet protocol addresses for the second base station that are associated with the second plurality of streaming media contents, wherein the second plurality of streaming media contents includes the one of the first plurality of streaming media contents.

16. The device of claim 15, wherein the operations further comprise:
detecting a criterion for transferring to the second base station; and
transmitting a second request to subscribe to the one of the first plurality of streaming media contents to the second base station, the second request including a second source specific multicast internet protocol address for the second base station that is associated with the one of the first plurality of streaming media of the second plurality of source specific multicast Internet protocol addresses for the second base station that is associated with the one of the first plurality of streaming media that is associated with the one of the first plurality of streaming media contents for the second base station;

receiving an identification of a second broadcast channel of the second base station in response to the second request, the second broadcast channel of the second base station associated with the one of the first plurality of streaming media contents;

tuning to the second broadcast channel of the second base station; and receiving the one of the first plurality of streaming media contents via the second broadcast channel of the second base station.

17. The device of claim 16, wherein the criterion comprises at least one of:

a location of the processor with respect to the second base station;

a received signal strength from the second base station; and a signal to noise ratio from the second base station.

18. The device of claim 15, wherein the first source specific multicast internet protocol address for the first base station and the second source specific multicast internet protocol address for the second base station are different.

19. The device of claim 14, wherein the first broadcast channel comprises a downlink control channel of the first base station.

20. The device of claim 14, wherein the first broadcast channel comprises a first plurality of radio frequency resource blocks of the first base station, and wherein the second broadcast channel comprises a second plurality of radio frequency resource blocks of the first base station.

* * * * *